(12) United States Patent
Shankara et al.

(10) Patent No.: US 7,836,316 B2
(45) Date of Patent: Nov. 16, 2010

(54) CONSERVING POWER IN PROCESSING SYSTEMS

(75) Inventors: Udaya Shankara, Bengalooru (IN); Veluchamy Dinakaran, Bengalooru (IN)

(73) Assignee: Intel Corporation, Santa Clara, CA (US)

( * ) Notice: Subject to any disclaimer, the term of this patent is extended or adjusted under 35 U.S.C. 154(b) by 879 days.

(21) Appl. No.: 11/682,215

(22) Filed: Mar. 5, 2007

(65) Prior Publication Data

US 2007/0277050 A1 Nov. 29, 2007

(30) Foreign Application Priority Data

Mar. 28, 2006 (IN) .......................... 836/DEL/2006

(51) Int. Cl.
*G06F 1/00* (2006.01)
*G06F 15/00* (2006.01)
*G06F 9/00* (2006.01)
*G06F 9/46* (2006.01)
*G06F 15/16* (2006.01)

(52) U.S. Cl. ........................ 713/320; 713/322; 713/323; 712/31; 712/34; 712/43; 712/220; 718/102; 718/105; 345/502

(58) Field of Classification Search ................. 713/320, 713/322, 323; 712/31, 34, 43, 220; 718/102, 718/105; 345/502
See application file for complete search history.

(56) References Cited

U.S. PATENT DOCUMENTS

| 6,941,485 | B2 * | 9/2005 | Nomura et al. | 713/501 |
| 7,015,913 | B1 * | 3/2006 | Lindholm et al. | 345/501 |
| 7,134,031 | B2 * | 11/2006 | Flautner | 713/322 |
| 7,536,567 | B2 * | 5/2009 | Bonola et al. | 713/300 |
| 2006/0282826 | A1 * | 12/2006 | Dockser | 717/127 |

* cited by examiner

*Primary Examiner*—Stefan Stoynov
(74) *Attorney, Agent, or Firm*—Blakely, Sokoloff, Taylor & Zafman LLP

(57) ABSTRACT

A network device may comprise an auxiliary processor to conserve the power of the network device. The auxiliary processor may modify one or more definition parameters of the programmable processing unit based on determining that the load value of the programmable processing unit is lower than a threshold value. The modifying of the definition parameters may comprise reducing an operating frequency of the programmable processing unit, reducing a number of a micro-programmable units resident on the programmable processing unit, or both.

30 Claims, 4 Drawing Sheets

CONSERVING POWER IN PROCESSING SYSTEMS

This application claims priority to Indian Application Number 836/DEL/2006 filed Mar. 28, 2006.

BACKGROUND

A processing system generally refers to devices such as laptops, desktops, mobile phones, servers, fax machines, printers that can process data and communicate with other processing systems. The processing systems may operate at different load levels at different time points. The processing systems may utilize power to perform operations.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes conserving power in processing systems. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, and acoustical signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
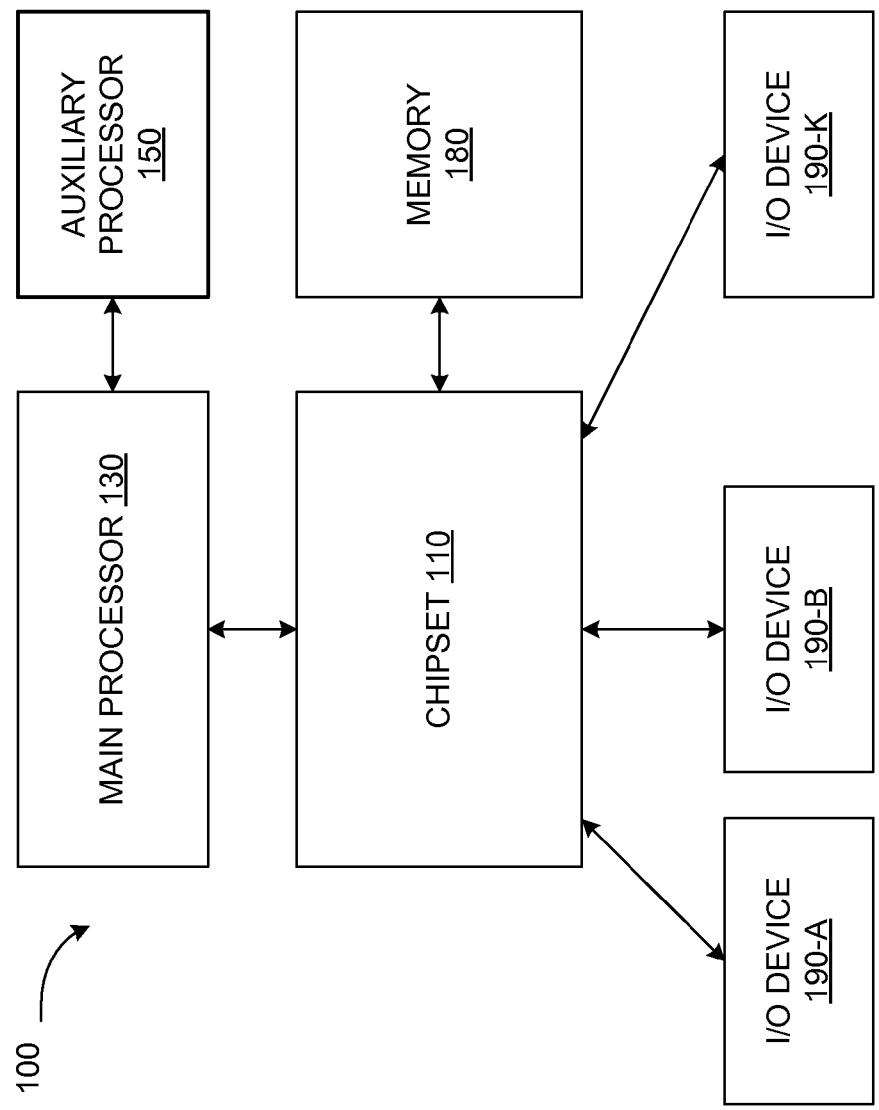
FIG. 1 illustrates an embodiment of a processing system.

An embodiment of a computing device 100 is illustrated in FIG. 1. The computing device 100 may comprise a chipset 110, a main processor 130, an auxiliary processor 150, a memory 180, and I/O devices 190-A to 190-K.

The chipset 110 may comprise one or more integrated circuits or chips that operatively couple the main processor 130, the memory 180, and the I/O devices 190. In one embodiment, the chipset 110 may comprise controller hubs such as a memory controller hub and an I/O controller hub to, respectively, couple with the memory 180 and the I/O devices 190. The chipset 110 may receive packets corresponding to a transaction generated by the I/O devices 190 on links such as the PCI Express links and may forward the packets to the memory 180 and/or the main processor 130. Also, the chipset 110 may generate and transmit transactions to the memory 180 and the I/O devices 190 on behalf of the main processor 130.

The memory 180 may store data and/or software instructions and may comprise one or more different types of memory devices such as, for example, DRAM (Dynamic Random Access Memory) devices, SDRAM (Synchronous DRAM) devices, DDR (Double Data Rate) SDRAM devices, or other volatile and/or non-volatile memory devices used in processing systems such as the processing system 100.

The main processor 130 may manage various resources and processes within the processing system 100 and may execute software instructions as well. The main processor 130 may comprise, for example, one or more microprocessors from the Pentium®, Itanium®, or XScale™ family of Intel® microprocessors. The main processor 130 may interface with the chipset 110 to transfer data to the memory 180 and/or the I/O devices 190.

The main processor 130 may perform data processing operations, for example, based on a fetch-decode-execute cycles. In one embodiment, the main processor 130 may perform processing of data generated by applications related to encryption/decryption, accounting, word processing, networking, weather forecasting, and such other applications. However, the main processor 130 may delegate some processing tasks, such as IPV4 forwarding and encryption, to the auxiliary processor 150.

The auxiliary processor 150 may receive delegated tasks and perform the delegated processing tasks. The auxiliary processor 150 may consume power to perform the processing. The tasks to be performed by or the load on the auxiliary processor 150 may vary with reference to time. In one embodiment, the auxiliary processor 150 may comprise one or more programmable processing units (PPU). Each programmable processing unit may be defined by set of definition parameters based on which the PPU may operate. In one embodiment, the definition parameters may comprise an operating frequency at which the programmable processing unit may operate to perform the processing tasks.

In one embodiment, the definition parameters may comprise a number of micro-programmable units (MPU) that a PPU may use to perform the tasks. In one embodiment, the auxiliary processor 150 may reduce the operating frequency and/or reduce the number of MPUs used to perform processing based on the load on the auxiliary processor 150. In one embodiment, the operating frequency may be reduced by reducing the clock frequency, for example, by passing the clock signal through a frequency divider circuit. In one embodiment, the auxiliary processor 150 may reduce the number of MPUs used by turning of some of the MPUs and performing the tasks using the remaining MPUs.

In one embodiment, the auxiliary processor 150 may determine the load at pre-determined intervals of time. In one embodiment, the auxiliary processor 150 may determine the load based on the idle cycle count corresponding to each PPU. In one embodiment, the auxiliary processor 150 may comprise Intel® Microengine Architecture, which may comprise one or more PPUs such as microengines and each microengine may comprise N number of threads. Each thread may represent a micro-programmable unit (MPU).

Figure 2:
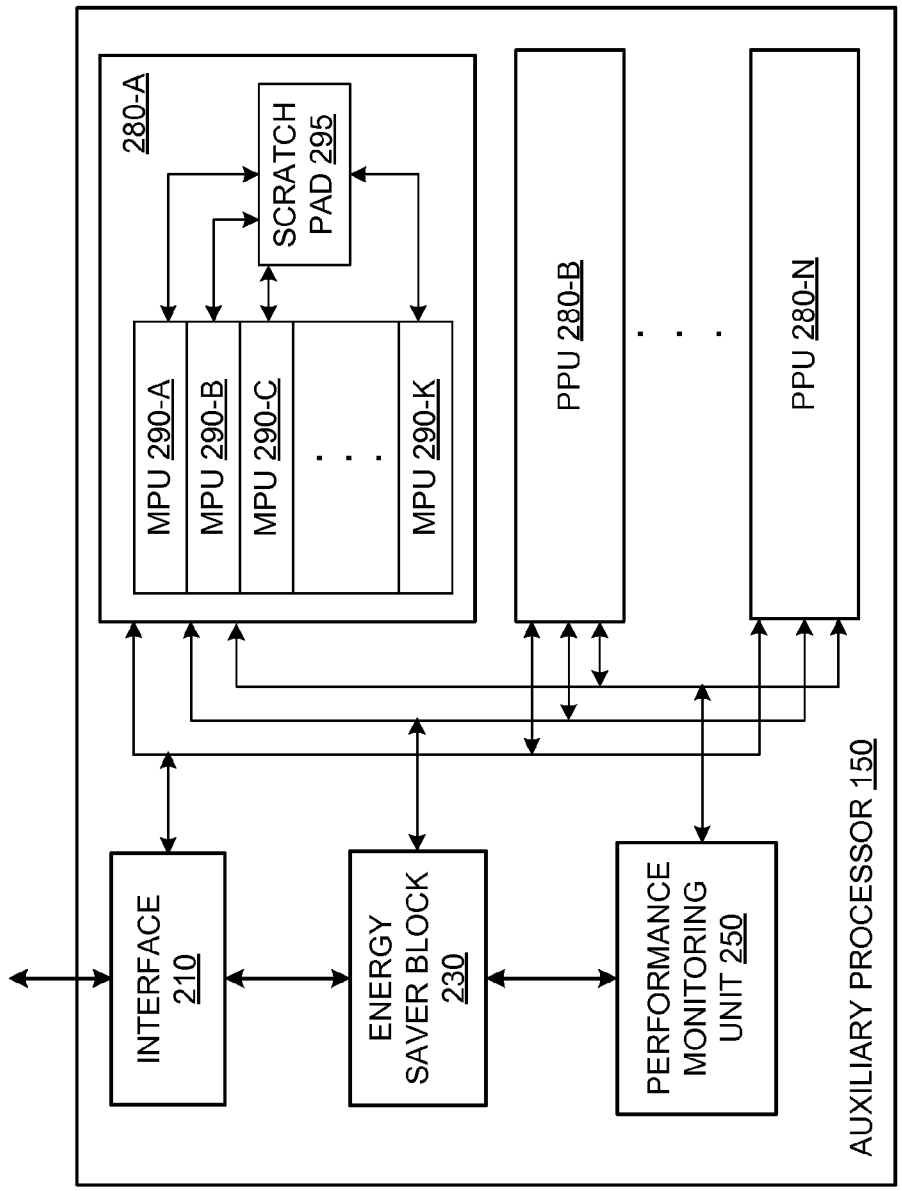
FIG. 2 illustrates an embodiment of an auxiliary processor of FIG. 1

An embodiment of the auxiliary processor 150 is illustrated in FIG. 2. The auxiliary processor 150 may comprise an auxiliary interface 210, an energy saver block 230, a performance monitoring unit PMU 250, and PPUs 280-A through 280-N.

The auxiliary interface 210 may provide an interface for the auxiliary processor 150 to communicate with the main processor 130. In one embodiment, the auxiliary interface 210 may support a PCI interconnect protocol or a memory interface protocol to couple the auxiliary processor 150 to the main processor 130. In one embodiment, the auxiliary interface 210 may receive instructions and/or data units from the main processor 130 and may pass the data to the PPUs 280-A to 280-N.

The performance monitoring unit 250 may store values, periodically and dynamically, that may indicate the load on the programmable processing units 280. In one embodiment, the PMU 250 may comprise counters that store an idle cycle count corresponding to each PPU 280. In one embodiment, the idle cycle count values, stored in the PMU 250, may be used to determine the load on each PPU 280.

The programmable processing unit (PPU) 280-A may receive the data units and/or instructions from the main processor 130 and perform corresponding processing. In one embodiment, the PPU 280-A may comprise one or more micro programmable units (MPU) 290-A to 290-K and a scratch pad 295. In one embodiment, each PPU may comprise one or more MPUs and a scratch pad.

The PPU 280-A may comprise a scheduling mechanism to schedule the MPUs 290-A to 290-K based on various models such as an ordered thread model and a pool of threads model. In one embodiment, in the ordered thread model, each MPU may be dependent on the signal provided by an immediate previous MPU to start the operation. Such dependencies may result in an ordered sequence in which the MPUs start processing the data units.

For example, the MPU 290-A may receive a data unit D1, perform processing of D1, and issue a memory I/O command. The MPU 290-A may store a valid signal in the scratch pad 295 and may start polling the scratch pad 295, repeatedly at pre-determined time intervals, to determine if a valid signal is present in the scratch pad 295. In one embodiment, the valid signal may comprise information related to the data units processed by the MPU 290-A. The MPU 290-B, which may also be polling the scratch pad 295 repeatedly may read the valid signal from the scratch pad 295 that may be stored by the MPU 290-A.

Similarly, a next MPU may poll the scratch pad 295, repeatedly, until reading a valid signal stored by an immediate previous MPU. The MPU 290-A may be scheduled, again, after the MPU 290-A reads a valid signal, from the scratch pad 295, stored by the MPU 290-K. In one embodiment, the valid signal may comprise information related to the data units processed by the MPU 290-K. Each MPU may perform memory read operations on the scratch pad 295, repeatedly, until reading a valid signal from the scratch pad 295. Each MPU may, for example, receive a null value until a valid signal is present in the scratch pad 295.

In a pool-of-threads model, any MPU that is free may perform processing of the data units after receiving a valid signal from any of the previous MPU. In one embodiment, the valid signal may comprise information related to the data units processed by the previous MPU. However, in each of the above models, the MPUs poll or perform memory read operations to read the contents of the scratch pad 295 repeatedly, for example, at pre-determined time intervals. In one embodiment, the power consumed by an MPU in performing the memory I/O reads may be decreased by decreasing the number of memory I/O reads issued by the MPUs if the load on the corresponding PPU is low.

In one embodiment, the memory I/O reads issued by the MPUs may be decreased by operating the MPUs at a reduced operating frequency or by reducing the number of MPUs or by reducing both the operating frequency and the number of MPUs during the times of low load. Such an approach may conserve power of the processing system 100 as the number of memory I/O reads may reduce substantially. Also, such power conservation techniques, performed by the auxiliary processor 150, may, for example, increase the battery life of the processing system 100 such as an Intel® Centrino® based laptop computers. Such an approach may reduce the load on the main processor 130, as well, as the auxiliary processor 150 operates substantially independent of the main processor 130.

The energy saver block 230 may determine threshold values and Mode values for each programmable processing units 280-A to 280-N. In one embodiment, the threshold values may represent an integer value and the idle cycle count may be compared with the integer value. In one embodiment, the energy saver block 230 may read the idle cycle count of each PPU from the corresponding registers of the PMU 250 and compare the idle cycle count values with the threshold values, and determine the load level on each PPU. For example, if the idle cycle count value of the PPU 280-A is less than the threshold value, the energy saver block 230 may determine that the PPU may be heavily loaded and may not perform conservation of power.

The energy saver block 230 may determine that the PPU 280-A may be lightly loaded if the idle cycle count is greater than the threshold value. In one embodiment, energy saver block 230 may determine the mode in which the PPU may operate, to conserve power of the computing device 100, if the PPU 280-A is lightly loaded. In one embodiment, the energy saver block 230 may cause the PPU 280-A to operate the MPUs 290-A to 290-K at a reduced operating frequency if the mode equals Mode-A. In one embodiment, the energy saver block 230 may cause the PPU 280-A to operate with reduced number of MPUs, for example, by operating the alternate MPUs 290-A, 290-C, 290-E and so on, while switching off the MPUs 290-B, 290-D, 290-F and so on if the mode equals Mode-B. In one embodiment, the energy saver block 230 may cause the PPU 280-A to operate with reduced number of MPUs and operating those MPUs at a reduced operating frequency if the mode equals Mode-C.

In one embodiment, the energy saver block 230 may determine the mode in which the PPU 280-A may be operated to conserve power of the processing system 100. In one embodiment, the energy saver block 230 may control the operating frequency (Y) and/or the number of MPUs (X) used to perform the processing. In one embodiment, the energy saver block 230 may cause PPU 280-A to operate in Mode-A as a result of which the MPUs 290-A to 290-K of the PPU 280-A may operate at a frequency of Y/2. In one embodiment, the energy saver block 230 may cause PPU 280-A to operate in Mode-B as a result of which the number of MPUs (X) may be reduced to X/2. In one embodiment, the energy saver block 230 may cause PPU 280-A to operate in Mode-C as a result of which the number of MPUs (X) may be reduced to X/2 and the operating frequency (Y) may be reduce to Y/2. However, the energy saver block 230 may decrease the number of MPUs by any value, for example, the number of MPUs may be decreased form 8 to 5 or 4 or 3 and such other values. The operating frequency of the MPUs may also be reduced by any value, for example, from Y to Y/3, Y/4, Y/5, Y/8, and such other values.

Figure 3:
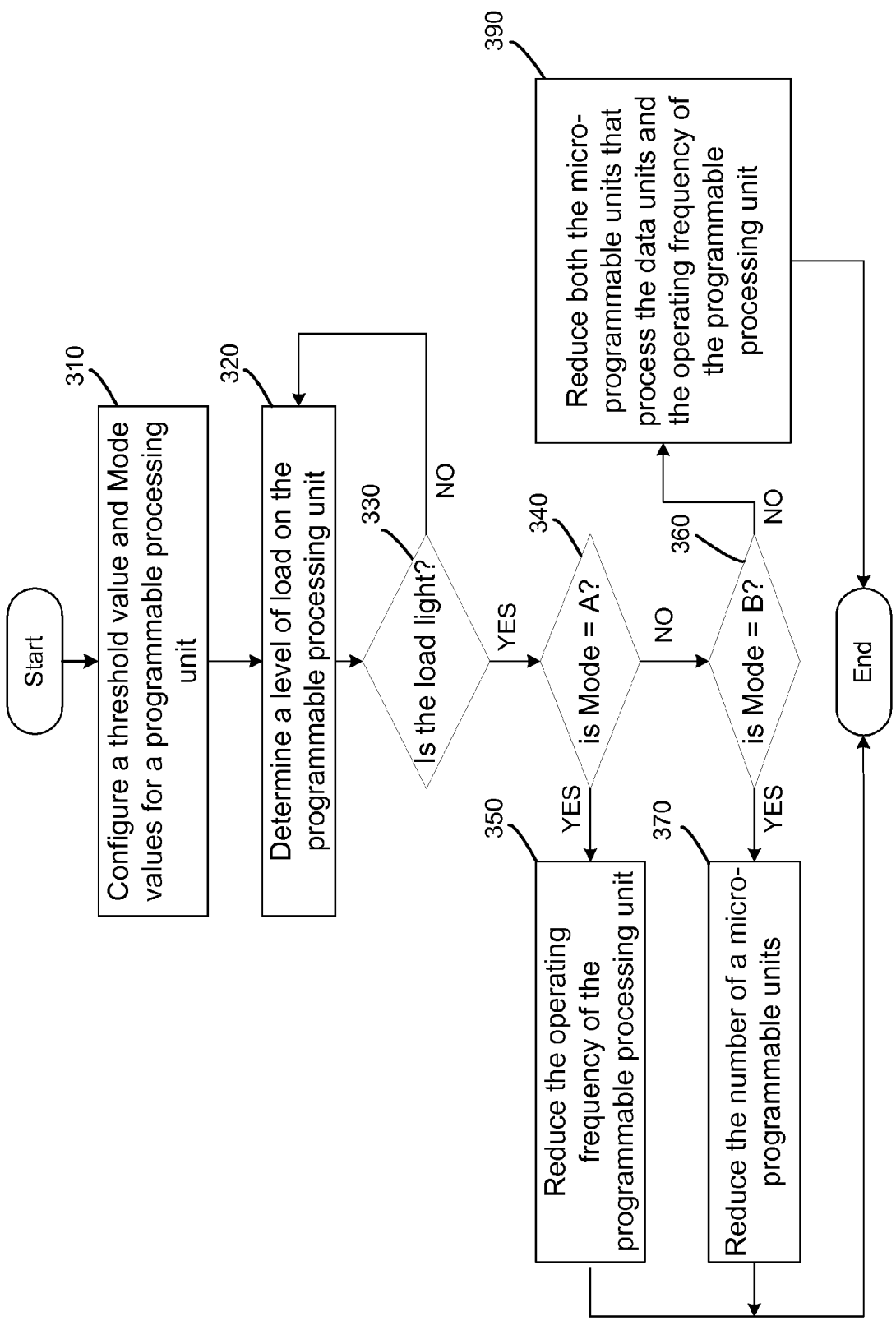
FIG. 3 illustrates an embodiment of an operation of the auxiliary processor to conserve power.

An embodiment of an operation of the auxiliary processor 130 conserving power is illustrated in FIG. 3. In block 310, the energy saver block 230 may configure the threshold values and Modes corresponding to each programmable processing unit.

In block 320, the energy saver block 230 may determine a level of load on the programmable processing unit PPU 280-A. In one embodiment, the energy saver block 230 may read the contents of an idle cycle count register, corresponding to the PPU 280-A, from the PMU 250. The energy saver block 230 may use the contents of the idle cycle count to determine the level of load on the PPU 280-A.

In one embodiment, the energy saver block 230 may set a MSB bit, in a register, to a first value if the level of load is light and to a second value if the level of load is high. The energy saver block 230 may set the MSB bit to one if the idle cycle count is more than the threshold value and to zero if the idle cycle count is less than the threshold value. The energy saver block 230 may set the (MSB-1) and (MSB-2) bits to indicate a mode in which the PPUs may be operated.

For example, if the MSB is set to one, the other bits of the register may be set to a value 00, 01, and 10 to indicate Mode-A, Mode-B, and Mode-C respectively. The mode in which the PPU may be operated may be determined based on the difference between the idle cycle count and the threshold value. In one embodiment, if the difference is less than a pre-determined value M the MSB-1 and MSB-2 bits may be set to 00, if the difference is between M and N the MSB-1 and MSB-2 bits may be set to 01, and if the difference is greater than N the MSB-1 and MSB-2 may be set to 10. However, more number of bits may be used to represent more modes in which the PPUs may be operated.

In block 330, the energy saver block 230 may determine if the load is light and control passes to block 340 if the condition is true and back to block 320 otherwise.

In block 340, the energy saver block 230 may determine if the mode equals A (00) by checking the bits of the register and control passes to block 350 if the condition is true and to block 360 otherwise.

In block 350, the energy save block 230 may cause the operating frequency of the PPU 280-A to be reduced, for example, by half.

In block 360, the energy saver block 230 may determine if the MSB-1 and MSB-2 bits of the register equals a pre-determined value such as 10 and may cause control to pass to block 370 if the condition is true and to block 390 otherwise.

In block 370, the energy save block 230 may cause the number of the MPUs of the PPU 280-A to be reduced, for example, to half.

In block 390, the energy save block 230 may cause both, the operating frequency of the MPUs 290-A to 290-K and the number of the MPUs of the PPU 280-A to be reduced, for example, to half of the original value.

Figure 4:
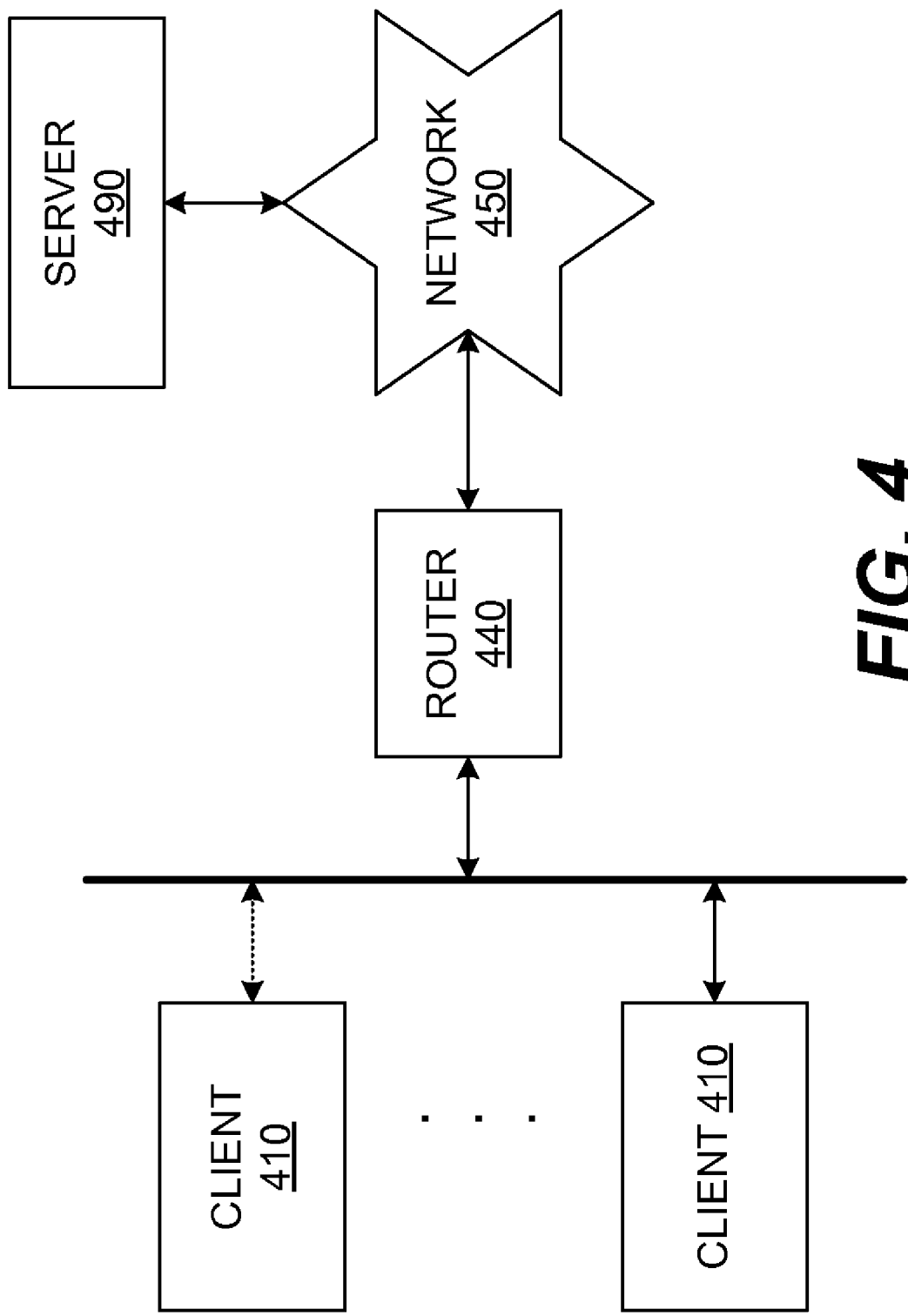
FIG. 4 illustrates a network environment comprising processing systems of FIG. 1.

An embodiment of a network environment is illustrated in FIG. 4. The network environment comprises a client 410, a router 440, a network 450, and a server 490. In one embodiment, the client 410-A may send a query to the server 490. The query generated by the client 410-A may be sent to the router 440 via a local area network, wide area network, virtual private network or any such network using a wired or a wireless medium. The router 440 may route the query to the server 490 via the network 450.

In one embodiment, the client 410, the router 440, and/or the server 490 may comprise a main processor such as the main processor 130 and an auxiliary processor such as the auxiliary processor 150. The auxiliary processor 150 may conserve power by reducing the operating frequency of processing and/or by reducing the number of MPUs used to process the data units based on the load on programmable processing units of the auxiliary processor as described above.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An apparatus comprising:
  an interface, wherein the interface is to receive data units,
  a performance monitoring unit coupled to the interface, wherein the performance monitoring unit is to determine a load value on a programmable processing unit, and
  an energy saver unit coupled to the performance monitoring unit, wherein the energy saver unit is to conserve power by modifying one or more definition parameters of the programmable processing unit if the load value is less than a pre-determined value, wherein the definition parameters comprise a first value that represents an operating frequency at which the programmable processing unit is to be operated to satisfy the load value and a second value that represents a number of a micro-programmable units of the programmable processing unit that is to be maintained in an active state to meet the load value, wherein a present micro-programmable unit is to provide a signal to a subsequent micro-programmable unit after the present micro-programmable unit completes processing of a data unit, wherein modifying the one or more definition parameters is to reduce memory input-output commands issued by the micro-programmable units.

2. The apparatus of claim 1 the energy saver unit is to reduce the first value that causes the operating frequency of the programmable processing unit to be reduced if the load on the programmable processing unit is less than the pre-determined value.

3. The apparatus of claim 1 the energy saver unit is to reduce the second value that causes the number of the micro programmable units to be reduced if the load value of the programmable processing unit is less than the pre-determined value.

4. The apparatus of claim 1 the energy saver unit is to reduce the first value and the second values that, respectively, causes the operating frequency of the programmable processing unit and the number of the micro programmable units to be reduced if the load value of the programmable processing unit is less than the pre-determined value.

5. The apparatus of claim 1, wherein the energy saver unit is to:
   extract an idle cycle count value stored in the performance monitoring unit that represents the load on the programmable processing unit,
   compare the idle cycle count value with a threshold value, and
   determine that the programmable processing unit is lightly loaded if the idle cycle count value is greater than the threshold value.

6. The apparatus of claim 1, wherein reducing the definition parameters of the programmable processing unit reduces a number of a memory operations performed by the micro-programmable units of the programmable processing unit.

7. The apparatus of claim 6, wherein reducing the number of the memory operations conserves power.

8. The apparatus of claim 1, wherein the energy saver unit is to determine the threshold value and a quantity by which the first value and the second value are to be reduced.

9. A method comprising
   determining a load value of a programmable processing unit, and
   modifying one or more definition parameters of the programmable processing unit if the load value is less than a pre-determined value, wherein the definition parameters comprise a first value that represents an operating frequency at which the programmable processing unit is to be operated to satisfy the load value and a second value that represents a number of a micro-programmable units of the programmable processing unit that is to be maintained in an active state to meet the load value, wherein a present micro-programmable unit is to provide a signal to a subsequent micro-programmable unit after the present micro-programmable unit completes processing of a data unit, wherein modifying the one or more definition parameters is to reduce memory input-output commands issued by the micro-programmable units.

10. The method of claim 9, wherein the modifying of the one or more definition parameters comprise reducing the first value that causes the operating frequency of the programmable processing unit to be reduced if the load on the programmable processing unit is less than the pre-determined value.

11. The method of claim 9 wherein the modifying of the one or more definition parameters comprise reducing the second value that causes the number of the micro programmable units to be reduced if the load of the programmable processing unit is less than the pre-determined value.

12. The method of claim 9 wherein the modifying of the one or more definition parameters comprise reducing the first value and the second value that, respectively, cause the operating frequency of the programmable processing unit and the number of the micro programmable units to be reduced if the load value of the programmable processing unit is less than the pre-determined value.

13. The method of claim 9, wherein the modifying of the one or more definition parameters comprise:
   extracting an idle cycle count value stored in the performance monitoring unit that represents the load on the programmable processing unit,
   comparing the idle cycle count value with a threshold value, and
   determining that the programmable processing unit is lightly loaded if the idle cycle count value is greater than the threshold value.

14. The method of claim 9, wherein the modifying the one or more definition parameters of the programmable processing unit reduces a number of a memory operations performed by the micro-programmable units of the programmable processing unit.

15. The method of claim 14, wherein reducing the number of the memory operations conserves power.

16. The method of claim 9 further comprises determining the threshold value and a quantity by which the first value and the second value are to be reduced.

17. A machine readable medium storage comprising a plurality of instructions that in response to being executed result in a computing device:
   determining a load value on a programmable processing unit, and
   modifying one or more definition parameters of the programmable processing unit if the load value is lower than a pre-determined value, wherein the definition parameters comprise a first value that represents an operating frequency at which the programmable processing unit is to be operated to satisfy the load value and a second value that represents a number of a micro-programmable units of the programmable processing unit that is to be maintained in an active state to meet the load value, wherein a present micro-programmable unit is to provide a signal to a subsequent micro-programmable unit after the present micro-programmable unit completes processing of a data unit, wherein modifying the one or more definition parameters is to reduce memory input-output commands issued by the micro-programmable units.

18. The machine readable storage medium of claim 17, wherein the modifying of the one or more definition parameters comprise reducing the first value that causes the operating frequency of the programmable processing unit to be reduced if the load on the programmable processing unit is less than the pre-determined value.

19. The machine readable storage medium of claim 17 wherein the modifying of the one or more definition parameters comprise reducing the second value that causes the number of the micro programmable units to be reduced if the load value of the programmable processing unit is less than the pre-determined value.

20. The machine readable storage medium of claim 17 wherein the modifying of the one or more definition parameters comprise reducing the first value and the second value that, respectively, cause the operating frequency of the programmable processing unit and the number of the micro programmable units to be reduced if the load value of the programmable processing unit is less than the pre-determined value.

21. The machine readable storage medium of claim 17, wherein the modifying of the one or more definition parameters comprise:
   extracting an idle cycle count value stored in the performance monitoring unit that represents the load on the programmable processing unit,
   comparing the idle cycle count value with a threshold value, and determining that the programmable processing unit is lightly loaded if the idle cycle count value is greater than the threshold value.

22. The machine readable storage medium of claim 17, wherein the modifying the one or more definition parameters of the programmable processing unit reduces a number of a memory operations performed by the micro-programmable units of the programmable processing unit.

23. The machine readable storage medium of claim 22, wherein reducing the number of the memory operations conserves power.

24. The machine readable storage medium of claim 17 further comprises determining the threshold value and a quantity by which the first value and the second value are to be reduced.

25. A network device comprising:
an interface to receive one or more data units,
a memory to store instructions and data units,
a main processor to offload one or more tasks to an auxiliary processor, and
the auxiliary processor to conserve power while performing the one or more tasks comprises determining a load value on a programmable processing unit and modifying one or more definition parameters of the programmable processing unit if the load value is less than a pre-determined value, wherein the definition parameters comprise a first value that represents an operating frequency at which the programmable processing unit is to be operated to satisfy the load value and a second value that represents a number of a micro-programmable units of the programmable processing unit that is to be maintained in an active state to meet the load value, wherein a present micro-programmable unit is to provide a signal to a subsequent micro-programmable unit after the present micro-programmable unit completes processing of a data unit, wherein modifying the one or more definition parameters is to reduce memory input-output commands issued by the micro-programmable units.

26. The network device of claim 25 the auxiliary processor is to reduce the first value that causes the operating frequency of the programmable processing unit to be reduced if the load on the programmable processing unit is less than the pre-determined value.

27. The network device of claim 25 the auxiliary processor is to reduce reduces the second value that causes the number of the micro programmable units to be reduced if the load value of the programmable processing unit is less than the pre-determined value.

28. The network device of claim 25 the energy saver unit is to reduce the first value and the second values that, respectively, causes the operating frequency of the programmable processing unit and the number of the micro programmable units to be reduced if the load value of the programmable processing unit is less than the pre-determined value.

29. The network device of claim 25, wherein the auxiliary processor is to compare an idle cycle count value of the programmable processing unit with a threshold value and determines that the programmable processing unit is lightly loaded if the idle cycle count value is greater than the threshold value.

30. The network device of claim 25, wherein the network device is to include one of a client system, a router, a handheld device, a mobile phone, or a server.

* * * * *

UNITED STATES PATENT AND TRADEMARK OFFICE
CERTIFICATE OF CORRECTION

PATENT NO. : 7,836,316 B2
APPLICATION NO. : 11/682215
DATED : November 16, 2010
INVENTOR(S) : Shankara et al.

It is certified that error appears in the above-identified patent and that said Letters Patent is hereby corrected as shown below:

In column 8, at line 19 claim 17 delete, "medium storage" and insert -- storage medium --.

In column 10, at line 13 claim 27 after, -- reduce — delete "reduces".

Signed and Sealed this
Third Day of May, 2011

David J. Kappos
*Director of the United States Patent and Trademark Office*